US006765898B1

United States Patent
Bloch

(10) Patent No.: US 6,765,898 B1
(45) Date of Patent: Jul. 20, 2004

(54) MICRO CELL BASE STATION WITH INTERFERING SIGNAL ATTENUATION

(75) Inventor: Samuel Bloch, Stuttgart (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/413,897

(22) Filed: Oct. 7, 1999

(30) Foreign Application Priority Data

Aug. 20, 1999 (EP) .............................................. 99440234

(51) Int. Cl.[7] .......................... H04B 7/216; H04B 15/00
(52) U.S. Cl. .................. 370/342; 455/63.4; 455/562.1; 455/444
(58) Field of Search ................................. 370/335, 328, 370/332, 342–441, 334; 455/444, 436–443, 501, 67.1, 67.3, 562, 561, 25, 422, 446–449, 462, 465, 524, 63, 63.1–63.4, 67.11, 67.13, 562.1, 422.1

(56) References Cited

U.S. PATENT DOCUMENTS

| | | | | |
|---|---|---|---|---|
| 5,548,809 A | * | 8/1996 | Lemson | 370/281 |
| 5,818,385 A | * | 10/1998 | Bartholomew | 455/440 |
| 5,867,485 A | * | 2/1999 | Chambers et al. | 370/281 |
| 5,953,670 A | * | 9/1999 | Newson | 455/454 |
| 6,173,014 B1 | * | 1/2001 | Forssen et al. | 455/132 |
| 6,198,925 B1 | * | 3/2001 | Lee | 455/434 |
| 6,470,194 B1 | * | 10/2002 | Miya et al. | 455/562 |
| 6,470,195 B1 | * | 10/2002 | Meyer | 455/562 |

FOREIGN PATENT DOCUMENTS

| | | |
|---|---|---|
| EP | 0 948 145 A2 | 10/1999 |
| GB | 2 314 997 A | 1/1998 |

OTHER PUBLICATIONS

Tsoulos, B.V. et al.: "Adaptive Antennas for Third Generation DS–CDMA Cellular Systems" Proceedings of the Vehicular Technology Conference, US, New York, IEEE, Bd. Conf. 45, 1995, pp. 45–49, XP000550132.

* cited by examiner

Primary Examiner—Erika Gary
Assistant Examiner—Eliseo Ramos-Feliciano
(74) Attorney, Agent, or Firm—Sughrue Mion, PLLC

(57) ABSTRACT

In a CDMA mobile telecommunications system with macro cells (C1) and micro cells (C2) the base station of the micro cells (C1) are designed in such a way that they are capable of arranging their reception area so that signals from any direction may be received in attenuated form [sic]. Interfering signals originating, in particular, from mobile stations (MS) outside micro cells (C2) are shielded in this manner. To generate null positions in the reception area of the micro cells, so-called null steering is used.

7 Claims, 2 Drawing Sheets

MICRO CELL BASE STATION WITH INTERFERING SIGNAL ATTENUATION

BACKGROUND OF THE INVENTION

The invention relates to a CDMA mobile telecommunications system, a base station and a method for receiving CDMA mobile telecommunications signals.

Mobile telecommunications systems are typically designed as cellular communications networks. Each cell comprises a base station. The mobile stations located within a cell communicate with the respective base station, which in turn forwards the signals, e.g., via a fixed network. CDMA mobile telecommunications systems (CDMA=Code Division Multiple Access) use code division multiplex in what is known as the spread spectrum instead of frequency division multiplex. This makes it possible for one base station to control more mobile stations within a cell of equal size.

CDMA is also used in UMTS (Universal Mobile Telecommunications System), IS95 and CDMA2000. To further increase the capacity of cellular mobile telecommunications systems and better adopt the systems to the topological conditions, so-called micro cells and macro cells are used. Micro cells are located completely within macro cells. A macro cell can contain a plurality of micro cells. Micro cells are used, for example, in areas with a very high density of mobile stations, e.g. in cities. In addition, there are also cells known as pico cells, which are primarily used for coverage within buildings. In principle, mobile stations within a macro cell require higher transmitting power than mobile stations within a micro cell. In each micro cell and each macro cell, an antenna is used to form a substantially circular or sectored reception area. Mobile stations within a macro cell communicate exclusively with the base station of the macro cell as long as they are not located within the reception area of a micro cell. If the mobile station gets into the reception area of a micro cell, a so-called handover is executed and the mobile station then communicates exclusively with the base station of the micro cell at clearly lower transmitting power.

SUMMARY OF THE INVENTION

Below, an inventive CDMA mobile telecommunications system according to Claim 1 with micro cells and macro cells is presented. The micro cells ore located within the macro cells. At least one micro cell is capable of attenuating the reception of at least one undesirable signal that has entered the micro cell from outside the micro cell. If a mobile station is located within a macro cell but outside a micro cell within this macro cell, the mobile station communicates exclusively with the base station of the macro cell. High transmitting power is required to maintain communication. Depending on the position of the mobile station within the macro cell, a situation may occur in which the high transmitting power of the mobile station has a negative effect on the reception within the micro cell. This may be the case particularly if the distance of the mobile station to the base station of the micro cell is smaller than the distance to the base station of the macro cell. According to the invention, the reception within the micro cell is then attenuated in the direction of the interfering mobile station. The reception of signals from mobile stations that are located within the micro cell and are sending with low transmitting power is then no longer impaired by the high transmitting power of the mobile station outside the micro cell.

Advantageously, so-called null steering is used to generate null positions in the reception area of the micro cell.

Advantageous embodiments of the invention are set forth in the dependent claims.

BRIEF DESCRIPTION OF THE DRAWINGS

Below, an exemplary embodiment of the invention is explained by means of two figures. The following show.

DETAILED DESCRIPTION OF THE INVENTION

Figure 1:
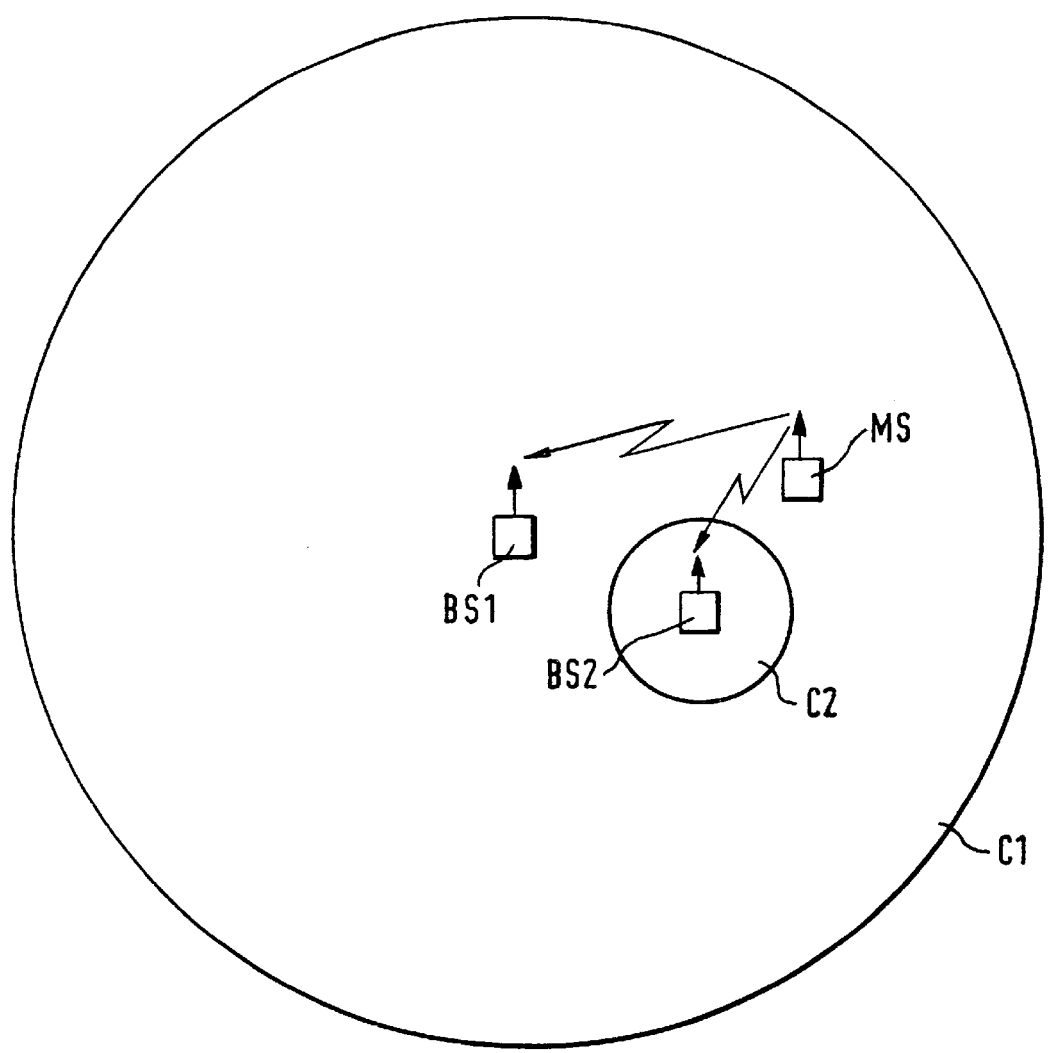
FIG. 1 a schematic representation of a CDMA mobile telecommunications system according to the invention and FIG. 2 a schematic structure of an inventive reception unit of a base station of a micro cell from FIG. 1.

The exemplary embodiment is first explained by means of FIG. 1. FIG. 1 shows a CDMA mobile telecommunications system according to the invention. The CDMA mobile telecommunications system has micro cells C2 and macro cells C1, whereby only one of each is shown for the sake of clarity and whereby the micro cells C2 are located within the macro cells C1.

At least one micro cell C2 is capable of attenuating the reception of at least one undesirable signal that is entering micro cell C2 from outside of micro cell C2. The undesirable signal is originating, for example, from a mobile station MS, which is located outside micro cell C2 but, for example, within macro cell C1 surrounding micro cell C2 and which is communicating with base station BS1 of macro cell C1. Due to the high transmitting power required for communication with base station BS1, interference with the reception from mobile stations located within micro cell C2 and sending with clearly lower transmitting power than mobile station MS may occur within micro cell C2.

According to the invention, the method for receiving signals from mobile stations located within micro cell C2 was modified as follows. To receive CDMA mobile telecommunications signals, an antenna is used to form a desired reception area of micro cell C2, for example, a substantially circular or sectored area. Among the received signals, a distinction is mode between desirable signals, i.e., signals from mobile stations within micro cell C2, and undesirable signals, i.e., particularly signals from mobile stations outside micro cell C2. In the direction of at least one undesirable signal, the reception area is modified so as to attenuate reception of the at least one undesirable signal. All signals from the concrete direction in which mobile station MS is located are strongly attenuated and, ideally, completely suppressed. Thus a small sector of the reception area is shielded. The size of the sector depends on the geometric arrangement and the number of the antennas used. Shielding occurs only as long as mobile station MS interferes with the reception within micro cell C2. Without such shielding, the reception of signals from mobile stations within micro cell C2 using the some carrier frequency as mobile station MS would be disturbed. As a consequence of the interference, the mobile stations would have to increase their transmitting power. As a consequence of the increase in transmitting power, the communication between mobile station MS and base station BS1 and/or neighboring cells could be disturbed. Base station BS1 would then prompt mobile station MS to increase its transmitting power. This would in turn interfere with the reception of signals from the mobile stations within micro cell C2, etc. This can cause instabilities throughout the entire network.

Figure 2:
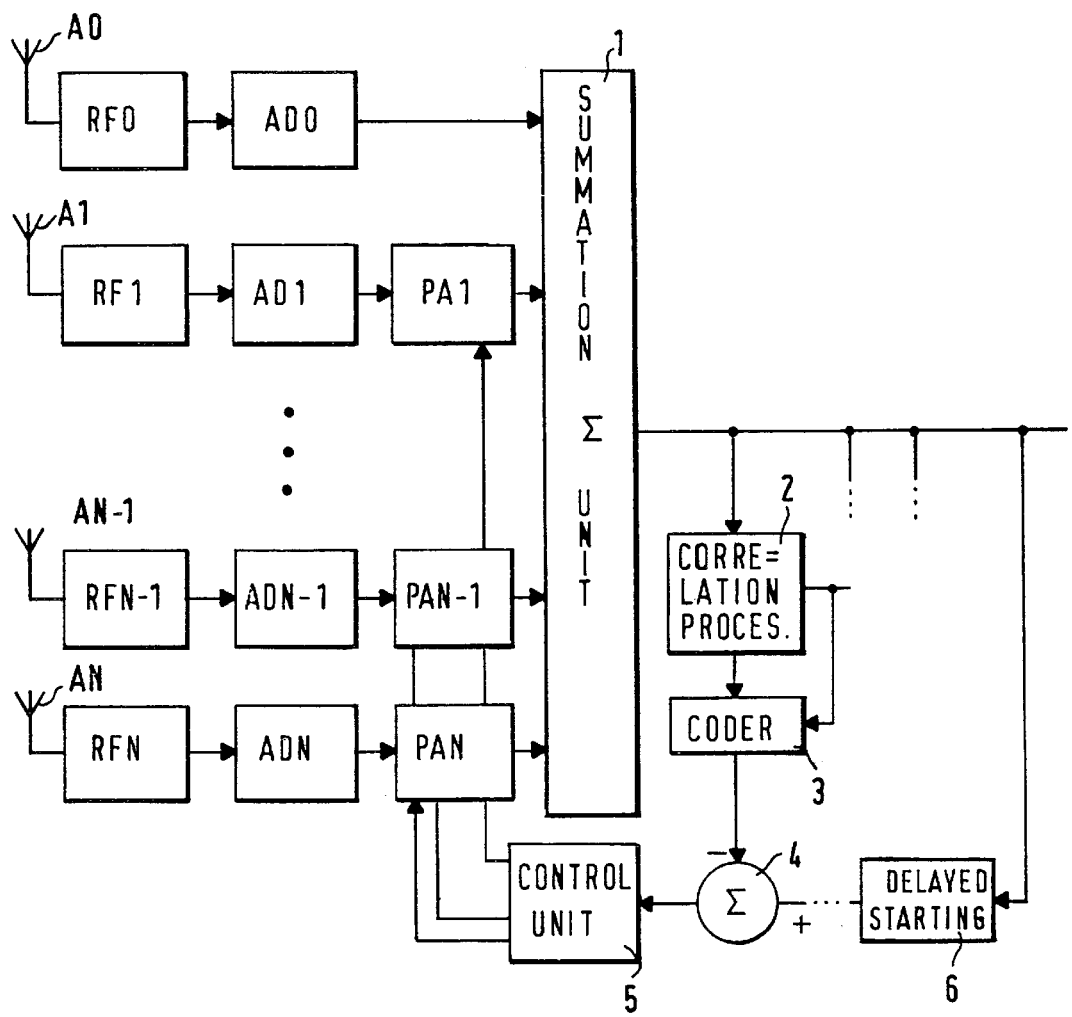

The exemplary embodiment will now be explained with the aid of FIG. 2. FIG. 2 shows an inventive reception unit of base station BS2 of micro cell C2 of FIG. 1.

Base station BS2 comprises an antenna arrangement A0, A1, AN–1, AN, which is capable of forming the reception area of base station BS2 such that signals from a specific direction are received in attenuated form.

The antenna arrangement A0, A1, AN–1, AN comprises a reference antenna A0 and at least one auxiliary antenna A1, AN–1, AN, in the example N, where N=6. The more auxiliary antennas are used, the more interferers can be simultaneously shielded. However, an increase in the number of auxiliary antennas also implies an increase in the complexity of the reception unit of base station BS2. A compromise solution must therefore be found when the number of auxiliary antennas is selected. The existing power control mechanism ensures that mobile stations located within micro cell C2 and within the shielded area con still communicate with base station BS2 during shielding. The transmitting power for these mobile stations, which typically are few, is increased. The total transmitting power within micro cell C2 can nevertheless be kept constant if the transmitting power of other sending mobile stations in micro cell C2 is at the same time slightly reduced. Transmitting power control is assumed by the power control mechanism of base station BS2.

Reference antenna A0 serves to receive CDMA mobile telecommunications signals. Connected in series with the reference antenna is a frequency converter RF0 that converts the frequency of the received signal. The received signal is subjected to fully coherent baseband conversion. Connected in series with converter RF0 is an analog-to-digital converter AD0. In the analog-to-digital converter AD0, the received converted signal is digitized and then supplied to a summation unit 1. Each auxiliary antenna A1, AN–1, AN serves to receive CDMA mobile telecommunications signals. A series connection comprising a frequency converter RF1, RFN–1, RFN, an analog-to-digital converter AD1, AND-1, AND and a unit PA1, PAN–1, PAN for influencing the amplitude and the phase of each composite CEMA mobile telecommunications signal received is post-connected to each auxiliary antenna A1, AN–1, AN. The output signals of each amplitude and phase influencing unit PA1, PAN–1, PAN are supplied to summation unit 1 in order to combine, i.e. to add, the received signals from reference antenna A0 and the at least one auxiliary antenna A1, AN–1, AN.

Furthermore, a control circuit for controlling the at least one amplitude and phase influencing unit PA1, PAN–1, PAN is provided. The control circuit comprises correlation processors 2 connected in parallel, of which only one is shown for the sake of clarity. The inputs of the correlation processors 2 ore connected with the output of the summation unit 1. The signals received from all antennas A0, A1, AN–1, AN are thus supplied to correlation processors 2. Each correlation processor 2 decodes a subscriber signal. The required code is contained in correlation processor 2 of base station BS2. For each signal to be simultaneously received, one correlation processor is required, so that, for example, a number of processors corresponding to the number of subscribers in micro cell C2 is post-connected in parallel to summation unit 1.

An encoder 3 is post-connected to each correlation processor 2. Each encoder 3 serves to encode the signal decoded in the preconnected correlation processor 2 with the some code that was used for decoding. This provides a CDMA encoded signal of a subscriber at the output of each encoder 3. A delay element 6 is connected in parallel with correlation processors 2. Delay element 6 is connected with the output of summation unit 1 and delays the signals received from all antennas A0, A1, AN–1, AN by the time span required for decoding and subsequent encoding in correlation processors 2 and encoders 3. The delay element 6 is designed, for example, as a shift register. By means of at least one summation unit 4, the output signals of encoder 3 are subtracted from the output signal of delay element 6. Ideally, the resulting difference is zero. In case of interference, a differential signal results in the output of summation unit 4, which comprises the received undesirable mobile telecommunications signal of mobile station MS and noise. The output signal of summation unit 4 is supplied to a control unit 5. Control unit 5 uses a null steering algorithm. Thus, the useful information obtained in correlation processors 2 is used to extract the contributions of the subscribers located in micro cell C2 from the total signal received. The remaining residue signal contains only interference portions. Control unit 5 uses this residue signal for adaptive control of the auxiliary antennas A1, AN–1, AN.

Reference antenna A0 and auxiliary antennas A1, AN–1, AN do not necessarily require the some antenna diagram. Advantageously, auxiliary antennas A1, AN–1, AN are arranged in substantially circular form around reference antenna A0 or linearly along a straight line. For example, if N=6 auxiliary antennas A1, AN–1, AN, these auxiliary antennas can be arranged around the reference antenna A0 at a distance of 60 degrees each. The number of auxiliary antennas A1, AN–1, AN determines the number of maximum possible null positions.

The antenna arrangement A0, A1, AN–1, AN comprises, for example, a null steering antenna array. In the normal case, i.e., without interferers, the array is set to a default antenna diagram. By means of this diagram, signals from mobile stations within micro cell C2 can be optimally received. If an interferer appears, e.g., mobile station MS, the array automatically changes its diagram. The array generates zeros in the direction of the interfering signal and automatically removes these zeros when the interfering signals are no longer present. In the normal case, reference antenna A0 alone determines reception. The auxiliary antennas A1, AN–1, AN are then switched off, for example, by corresponding weighting of the amplitude or by an additional circuit looped into the signal path. When an interferer appears, reference antenna A0 plus at least one auxiliary antenna A1, AN–1, AN whose received signals are weighted in amplitude and phase determine the reception.

Furthermore, control unit 5 is provided for adoptive readjustment of the specific direction. Control unit 5 comprises a processor. To set the amplitude and phase influence, a trial and error method or a special mathematical algorithm may be used. With the first method, the settings are changed until optimal reception is established at the output. With the second method, a covariance matrix of the reception signals is formed and used to calculate the weighting factors for units PA1, PAN–1, PAN. If the mobile station MS moves, the shielded sector is automatically corrected. The optimization procedure is continuously performed for this purpose. The adaptive null steering algorithm acts together with the known algorithm for the transmitting power control mechanism. The two together have the effect that the sum of the transmitted signal levels of the mobile stations within micro cell C2 can be kept nearly constant. To prevent an undesired mutual influence of the algorithms, the adaptive null steering algorithm should respond more slowly than the transmitting power control mechanism.

Antenna arrangement A0, A1, AN−1, AN is thus capable of detecting among the received signals desired signals from subscribers within the micro cell and of temporarily shielding at least one reception direction disturbed by at least one subscriber outside the micro cell to suppress reception of at least one undesirable signal.

In the exemplary embodiment, base station BS2 is the base station of a CDMA mobile telecommunications system. Alternatively, the base station can also be the base station of an UMTS, IS95, CDMA2000 or similar mobile telecommunications system. The base station is characterized in that the base station then also comprises on antenna arrangement that is capable of forming the reception area of the base station in such a way that interfering signals from any direction can be received in attenuated form.

What is claimed is:

1. A CDMA mobile telecommunications system with micro cells and macro cells, wherein the micro cells are located within the macro cells, comprising:

at least one micro cell with means for modifying the reception area, in a direction of at least one undesirable signal so as to attenuate the reception of the at least one undesirable signal that has entered the micro cell from outside the micro cell;

a base station comprising:

an antenna arrangement modifying the reception area of the base station in a direction of the at least one undesirable signal such that at least one interfering signal received from said direction is received in an attenuated form, the antenna arrangement comprising:

a reference antenna, receiving CDMA mobile telecommunications signals;

at least one auxiliary antenna receiving the CDMA mobile telecommunications signals; and a summation unit combining the signals received by the reference antenna and at least one auxiliary antenna;

wherein between each auxiliary antenna and the summation unit is connected a respective unit for influencing the amplitude and the phase of the corresponding received CDMA mobile telecommunications signal, a control circuit to control the respective unit for influencing the amplitude and phase, whereby the control circuit comprises:

correlation processors connected in parallel; and a control unit, wherein all correlation processors are connected with the output of the summation unit and that the control unit operates with a null steering algorithm, a delay element connected in parallel to the correlation processors;

an encoder connected in series with each correlation processor; and an additional summation unit for said each correlation processor to subtract the output signals of the encoder from the output signal of the delay element and to supply the result to the control unit.

2. A mobile telecommunication system comprising:

a micro cell with means for attenuating the reception of at least one undesirable signal from outside of said micro cell; and a macro cell containing a plurality of the micro cells;

wherein a micro cell of the plurality of the micro cells has means for modifying a respective reception area of the micro cell in a direction of the at least one undesirable signal, whereby the respective reception area is modified based on the direction of the at least one undesirable signal, to attenuate the reception of said at least one undesirable signal, a base station comprising:

an antenna arrangement modifying a reception area of the base station in a direction of the at least one undesirable signal such that at least one interfering signal received from said direction is received in an attenuated form, wherein the antenna arrangement comprises:

a reference antenna, receiving CDMA mobile telecommunications signals;

at least one auxiliary antenna receiving the CDMA mobile telecommunications signals;

a summation unit combining the signals received by the reference antenna and at least one auxiliary antenna;

wherein between each auxiliary antenna and the summation unit is connected a respective unit for influencing the amplitude and the phase of the corresponding received CDMA mobile telecommunications signal, a control circuit to control the respective unit for influencing the amplitude and phase, whereby the control circuit comprises:

correlation processors connected in parallel and a control unit, wherein all correlation processors are connected with the output of the summation unit and that the control unit operates with a null steering algorithm, a delay element connected in parallel to the correlation processors;

an encoder connected in series with each correlation processor; and an additional summation unit for said each correlation processor to subtract the output signals of the encoder from the output signal of the delay element and to supply the result to the control unit.

3. A method for receiving CDMA mobile telecommunications signals, comprising:

providing a base station of a CDMA mobile telecommunications system, comprising:

an antenna arrangement modifying the reception area of the base station in a direction of at least one undesirable signal such that at least one interfering signal received from said direction is received in an attenuated form, wherein the antenna arrangement comprises:

a reference antenna, receiving CDMA mobile telecommunications signals;

at least one auxiliary antenna receiving CDMA mobile telecommunications signals;

a summation unit combining the signals received by the reference antenna and the at least one auxiliary antenna;

wherein between each auxiliary antenna and the summation unit is connected a respective unit for influencing the amplitude and the phase of the corresponding received CDMA mobile telecommunications signal, a control circuit to control the respective unit for influencing the amplitude and phase, whereby the control circuit comprises:

correlation processors connected in parallel; and a control unit, wherein all correlation processors are connected with the output of the summation unit and that the control unit operates with a null steering algorithm, a delay element connected in parallel to the correlation processors;

an encoder connected in series with each correlation processor; and an additional summation unit for said each correlation processor to subtract the output signals of the encoder from the output signal of the delay element and to supply the result to the control unit;

making a distinction, among the received signals, between desirable and undesirable signals; and modifying the reception area, in the direction of the at least one undesirable signal, so as to attenuate the reception of the at least one undesirable signal.

4. A base station of a CDMA mobile telecommunications system, comprising:

an antenna arrangement modifying the reception area of the base station in a direction of at least one undesirable signal such that at least one interfering signal received from said direction is received in an attenuated form, wherein the antenna arrangement comprises:

a reference antenna, receiving CDMA mobile telecommunications signals;

at least one auxiliary antenna receiving the CDMA mobile telecommunications signals; and a summation unit combining the signals received by the reference antenna and at least one auxiliary antenna;

wherein between each auxiliary antenna and the summation unit is connected a respective unit for influencing the amplitude and the phase of the corresponding received CDMA mobile telecommunications signal, a control circuit to control the respective unit for influencing the amplitude and phase, whereby the control circuit comprises:

correlation processors connected in parallel; and a control unit, wherein all correlation processors are connected with the output of the summation unit and that the control unit operates with a null steering algorithm, a delay element connected in parallel to the correlation processors;

an encoder connected in series with each correlation processor; and an additional summation unit for said each correlation processor to subtract the output signals of the encoder from the output signal of the delay element and to supply the result to the control unit.

5. The base station according to claim 4, wherein the antenna arrangement comprises a null steering antenna array generating at least one null position in an antenna diagram.

6. The base station according to claim 4, wherein said control unit is for adaptive readjustment of the direction from which the at least one interfering signal is received.

7. The base station according to claim 4, wherein the antenna arrangement is capable of detecting desired signals from among the received signals and temporarily shielding at least one selected reception direction to suppress the reception of the at least one undesirable signal.

* * * * *